Patented June 24, 1941

2,246,569

UNITED STATES PATENT OFFICE 2,246,569

PROCESS FOR OXIDIZING ETHERS

Ralph Lyman Brown, Bala-Cynwyd, Pa., assignor to The Solvay Process Company, New York, N. Y., a corporation of New York No Drawing. Application April 19, 1939, Serial No. 268,697

10 Claims. (Cl. 260—593)

This invention relates to a process for the production of aldehydes and ketones by the catalytic oxidation of alkyl ethers.

Aldehydes and ketones have heretofore been prepared by oxidizing alcohols. A primary alcohol yields on oxidation an aldehyde and a secondary alcohol a ketone. It is also known that by oxidizing ethyl ether a large number of different products are obtained in addition to water, among which ether peroxide, hydrogen peroxide, acetaldehyde and acetic acid have been identified. No practical use has been made, however, of a process of oxidizing ether by means of an oxygen gas to produce any product of the oxidation because of the variety of compounds obtained in small quantities from the reaction.

I have now discovered a procedure whereby the reaction of an alkyl ether with oxygen may be controlled to form primarily an aldehyde or a ketone, making it feasible to utilize the reaction for the production of these compounds from the ethers. In order to thus control the reaction, a mixture of the ether and oxygen gas is passed in contact with a catalyst promoting the oxidation of the ether by the oxygen gas and by limiting the amount of oxygen in the gas contacted with the catalyst to 0.6 mol of oxygen or less for every 1 mol of ether the reaction is caused to take place primarily to form an aldehyde or ketone. For example, ethyl ether reacts in accordance with the following equation to form acetaldehyde:

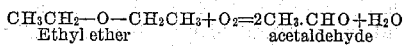

Isopropyl ether reacts in accordance with the following equation to form acetone:

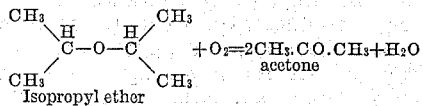

In carrying out the process of this invention the ether in the form of vapor mixed with air or other oxygen-containing gas in the above stated proportions, is passed through a catalyst bed heated to a temperature suitable for promoting the reaction of the ether and oxygen. Since the reaction is strongly exothermic, once the catalyst bed has been brought to the appropriate temperature the process is thermally self-supporting. In fact, it is advantageous to employ air rather than a pure oxygen gas for mixing with the ether, since the large volume of nitrogen increases the heat capacity of the reaction mixture and thus aids in maintaining suitable temperatures in the catalyst bed. In carrying out the process of this invention it is preferred, therefore, to pass a mixture of 0.5 to 3 mols of air to 1 mol of ether in contact with the catalyst. In some cases it may be advantageous to introduce water vapor into the initial gas mixture before contacting it with the catalyst in order to control the catalyst temperature by increasing the heat capacity of the reaction mixture. In general, any inert gas may be used for diluting the reactants for this purpose. Furthermore, the introduction of an inert gas into the reactants may be utilized to vary, as desired, the time of contact between the reactants and the catalyst. In passing through the catalyst the oxidation reaction of the ether with the oxygen takes place and the effluent gas contains, in addition to unchanged ether, nitrogen from the air and any water introduced into the initial gas mixture, a small amount of by-products such as carbon dioxide, carbon monoxide and hydrocarbons and a large amount of aldehyde or ketone and water formed by reaction of the ether and oxygen.

The catalyst employed is preferably one acting as a dehydrogenating and an oxygenating catalyst. Catalysts having these general properties in the treatment of organic materials are well known to the art. Silver and copper are examples of such catalysts and are the preferred catalysts used in carrying out this invention. The temperature at which the catalyst is maintained will vary with the ether being treated but in most cases will be between 100° and 600° C. For ethers whose radicals are straight chained the temperatures employed will, in general, be higher than when the radicals of the ether are branched. The space velocity at which the gases are contacted with the catalyst will also vary according to the ether being treated, the catalyst used and other conditions of operation. Generally, it is preferred to carry out the process at a pressure of about 1 atmosphere, although higher pressures may be used, if desired. For example, if the process of this invention is used for the treatment of the reaction product of a high pressure synthesis process, it may be desirable to carry out the oxidation of the ether at elevated pressures, for example at pressures up to about 10 atmospheres. Under some conditions the mixture of ether and oxygen to be catalyzed in carrying out this invention may be within the explosive limits for these materials. The particular construction of the catalyst chamber should then take into account this characteristic of the gases to be treated. For example, the catalyst chamber may be constructed so that catalysis takes place while the gases are flowing through small tubes.

While the process of this invention is broadly applicable to the treatment of alkyl ethers (ethers in which the oxygen is linked to two saturated aliphatic radicals) and mixed ethers in which one of the radicals linked to the oxygen of the ether is a saturated aliphatic radical, it is peculiarly applicable to the production of formaldehyde from dimethyl ether, acetaldehyde from ethyl ether and acetone from isopropyl ether.

I have discovered the oxidation of ether to aldehyde or ketone may be carried out simultaneously with the oxidation of alcohol to aldehyde or ketone. In the synthesis of alcohols both alcohol and ether are formed. For example, in the high pressure catalytic synthesis of methanol from carbon monoxide and hydrogen, dimethyl ether is formed in addition to methanol. In the synthesis of ethanol from ethylene, whether by absorption of ethylene in sulfuric acid followed by hydrolysis of the ethyl sulfuric acid thus obtained or by the high pressure direct hydration method, diethyl ether is produced along with ethanol. In some cases it may be desired to convert into an aldehyde or ketone both the alcohol and the ether produced in synthesizing the alcohol. I have discovered a mixture of alcohol and ether may be successfully oxidized to form aldehydes or ketones by the process of this invention. The amount of oxygen introduced into the mixture of alcohol and ether contacted with the catalyst in accordance with this invention is 0.6 mol or less of oxygen for every mol of alcohol and mol of ether.

The invention is illustrated by the following examples, although it is not limited thereto:

*Example I.*—Ethyl ether is vaporized and mixed with 1.3 mols of air per mol of ether. This mixture is passed over a catalyst composed of silver supported on a carrier of acid cleaned crushed brick made of diatomaceous earth. The rate of passage of the mixture of ether and air over the catalyst is such that about 6.5 mols of ether per hour are contacted with 50 cc. of catalyst. The catalyst is maintained at a temperature of about 465° C. to about 480° C., which temperature may be maintained by the heat of reaction of the ether and oxygen. The gases leaving the catalyst contain acetaldehyde and water together with unchanged ether. The ether may be recovered from the other constituents of the gases leaving the catalyst and again mixed with air and contacted with the catalyst so as to completely react the ether supplied to the process. By this procedure about 65% of the ether decomposed by contact with the catalyst is converted into acetaldehyde.

*Example II.*—Isopropyl ether is vaporized and mixed with 2 mols of air per mol of ether and passed at about 260° C. in contact with the same type of catalyst used in Example I; silver supported on crushed brick. Fused alumina may be used for the carrier, if desired, instead of the crushed brick. About 2½ mols of ether are contacted with 50 cc. of the catalyst per hour. The gases leaving the catalyst contain, in addition to unchanged ether, water vapor and acetone and but a small amount of by-products such as carbon monoxide and carbon dioxide. By recovering the unchanged ether from the gases and recycling it with air into contact with the catalyst all of the ether may be reacted. By carrying out the procedure of this example about 80% of the ether reacted by contact with the catalyst is converted into acetone.

I claim:

1. The process for the oxidation of an ether in which a saturated aliphatic radical is linked to the oxygen of the ether, which comprises passing a mixture of said ether and oxygen gas in proportions of 0.6 mol or less of oxygen for every 1 mol of ether in contact with a catalyst promoting the oxidation of the ether to a compound from the group consisting of the aldehydes and ketones.

2. The process for the oxidation of an alkyl ether which comprises passing a mixture of said ether and an oxygen gas containing 0.6 mol or less oxygen to every 1 mol of ether in contact with a contact agent acting as a dehydrogenating and oxygenating catalyst.

3. The process for the oxidation of an alkyl ether which comprises passing a mixture of said ether and air containing 0.5 to 3 mols of air to every 1 mol of ether in contact with a catalyst promoting the oxidation of the ether to a compound from the group consisting of the aldehydes and ketones.

4. The process for oxidizing a mixture of an alkyl alcohol and an alkyl ether to a compound from the group consisting of the aldehydes and ketones which comprises passing a mixture of said alcohol and ether and an oxygen gas in amounts corresponding to 0.6 mol or less of oxygen for every 1 mol of alcohol and ether in contact with a contact agent acting as a dehydrogenating and oxygenating catalyst.

5. The process for producing formaldehyde which comprises passing a mixture of dimethyl ether and air containing 0.5 to 3 mols of air per mol of ether in contact with a contact agent acting as a dehydrogenating and oxygenating catalyst.

6. The process for producing acetaldehyde which comprises passing a mixture of ethyl ether and air containing 0.5 to 3 mols of air per mol of ether in contact with a contact agent acting as a dehydrogenating and oxygenating catalyst.

7. The process for producing acetaldehyde which comprises passing a mixture of ethyl ether and air containing 0.5 to 3 mols of air per mol of ether in contact with a silver catalyst at a temperature of about 465° C. to about 480° C.

8. The process for producing acetone which comprises passing a mixture of isopropyl ether and air containing 0.5 to 3 mols of air per mol of ether in contact with a contact agent acting as a dehydrogenating and oxygenating catalyst.

9. The process for producing acetone which comprises passing a mixture of isopropyl ether and air containing 0.5 to 3 mols of air per mol of ether in contact with a silver catalyst at a temperature of about 260° C.

10. The process for the oxidation of an isoalkyl ether to a ketone which comprises passing a mixture of said ether and oxygen gas in the proportions of 0.6 mol or less of oxygen for every 1 mol of ether in contact with a catalyst promoting the oxidation of the ether to a ketone.

RALPH LYMAN BROWN.

CERTIFICATE OF CORRECTION.

Patent No. 2,246,569. June 24, 1941.

RALPH LYMAN BROWN.

It is hereby certified that error appears in the printed specification of the above numbered patent requiring correction as follows: Page 2, first column, line 67, Example II, for "$2\frac{1}{2}$" read --$2\frac{1}{4}$--; and that the said Letters Patent should be read with this correction therein that the same may conform to the record of the case in the Patent Office.

Signed and sealed this 22nd day of July, A. D. 1941.

(Seal)

Henry Van Arsdale,
Acting Commissioner of Patents.